Patented Jan. 1, 1946

2,391,918

UNITED STATES PATENT OFFICE 2,391,918

PROCESS FOR TREATING DISTILLERY SLOP

Ellis C. Pattee, Cincinnati, Ohio, assignor to National Distillers Products Corporation, a corporation of Virginia Application March 29, 1943, Serial No. 480,918

4 Claims. (Cl. 99—5)

This invention is a new and useful process for treating distillery slop.

In the manufacture of distilled liquors and of alcohol, by the fermentation of cereals, the cereal is first mashed and then fermented and then distilled. The residue remaining in the still is known as distillery slop and contains soluble materials in solution and insoluble materials in suspension. The soluble materials are solid when dried and these two materials may therefore be hereinafter referred to respectively as the soluble solids and insoluble solids of the distillery slop. In the distillery slop the suspended solids are normally present in a ratio by weight of about three times the soluble solids.

Figure 1:
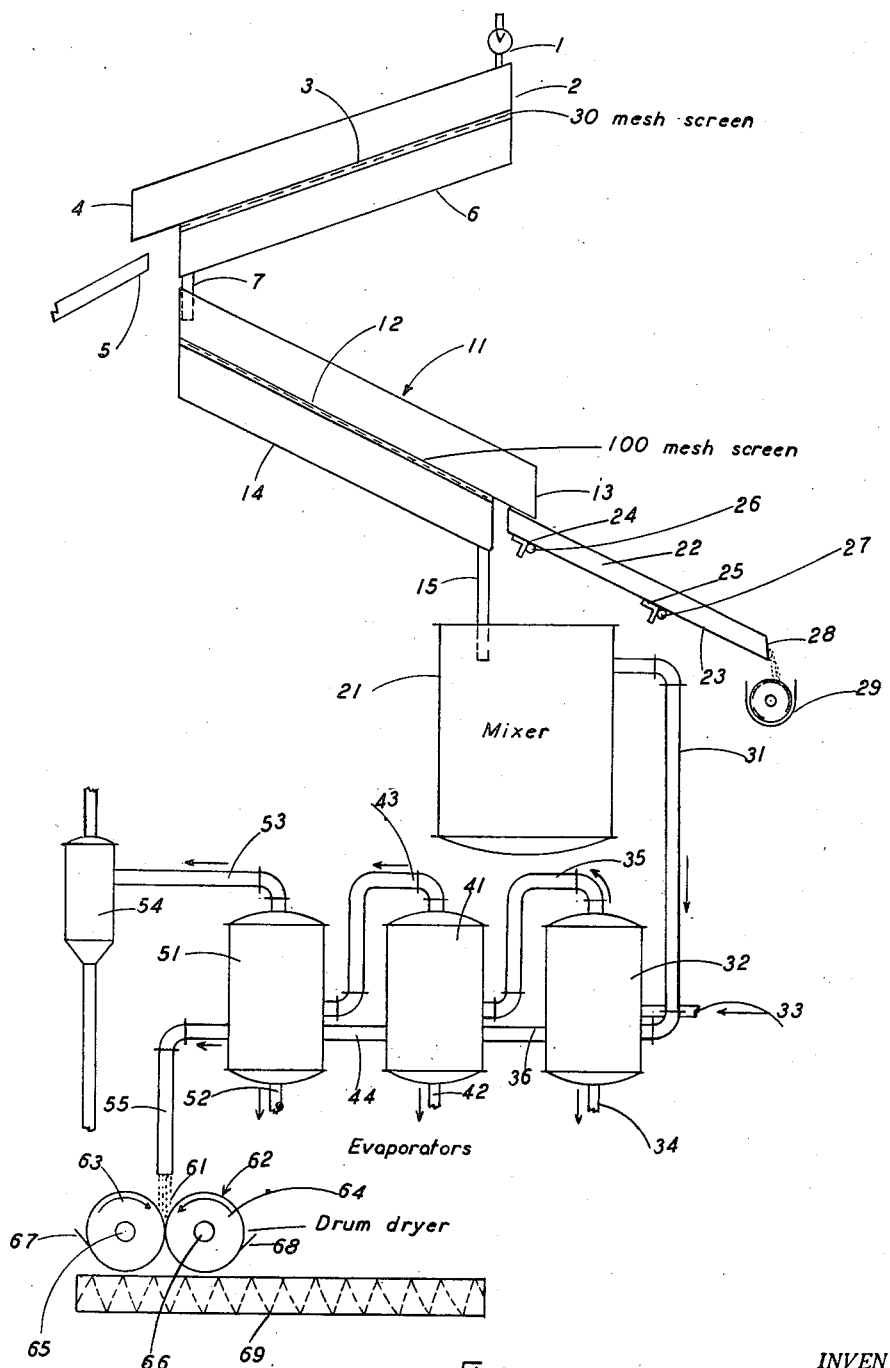
Figure 2:
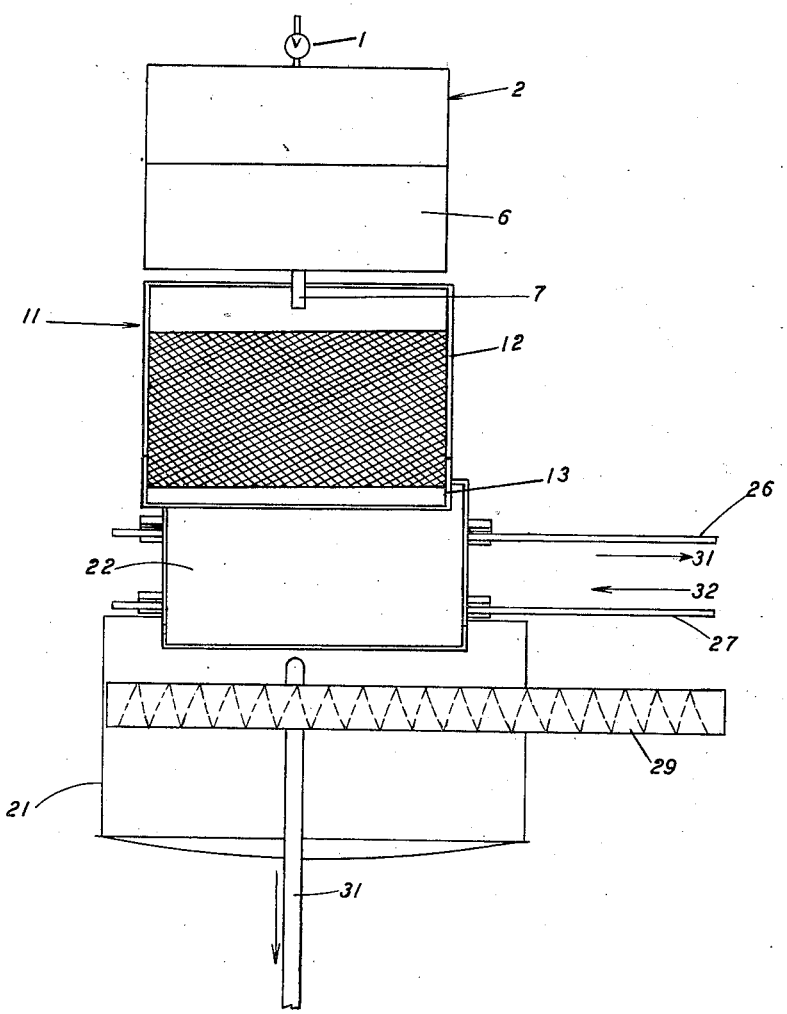

My invention for the treatment of distillery slop will be fully understood from the following description read in conjunction with the drawings, in which:

Figure 1 is a diagrammatic showing in side elevation of the cycle of operations and of the apparatus in which the invention may be carried into effect; and Figure 2 is a side elevation of a part of the construction shown in Figure 1 at a right angle to the showing in Figure 1.

Referring to the drawings, the distillery slop as withdrawn from the still is introduced through valved pipe 1 to the upper part of the screen 2. The screen surface 3 may be about 30-mesh. (Tyler specifications). The relatively larger or coarser insoluble solids present remain on top of the screen. Preferably the screen is of the oscillating or shaking type embodying some means for moving the material retained progressively forward so that these larger particles are continuously discharged from the lower end 4 of the screen and diverted from the system by means of chute 5 or any equivalent device. The material through the screen consists of the liquid carrying the soluble solids in solution and the relatively finer or smaller insoluble solids in suspension. The material retained on top of the screen carries some of the liquor, a part of which may be expressed and combined with the material through the screen.

This material flows downwardly in trough 6 and is discharged therefrom through outlet pipe 7 into the upper part of screen 11. The filtration or screening surface 12 of screen 11 is about 100-mesh (Tyler specifications). This screen is also preferably of the oscillating or shaking type so that the insoluble solids retained on top of the screen are continuously discharged from the lower end 13 thereof. The material through the screen consisting of the liquid containing the soluble solids in solution and a relatively small proportion of insoluble solids in suspension flows downwardly through trough 14 and is discharged therefrom through outlet pipe 15 into the mixer or mixing tank 21. Adjacent the lower end 13 of screen 12, I provide chute 22. The bottom 23 of the chute is provided with depending angles 24 and 25 which bear on horizontal rails 26 and 27 so that the chute 22 can be slid horizontally in a direction normal to the plane of Figure 1. The lower end 28 of the chute discharges into worm conveyor 29. By reference to Figure 2, it will be seen that this horizontal movement of chute 22 in the direction indicated by arrow 31 or arrow 32 serves to bring the chute variably and controllably under any desired proportion of the lower end 13 of screen 11, thereby enabling me to divert any desired proportion of the insoluble solids retained by the screen 11 into the worm conveyor 29 by which they are diverted from the system; conversely, the insoluble solids from the screen 11 not so diverted drop by gravity into the mixer diagrammatically indicated by 21 by means of which they are uniformly and continuously incorporated with the liquor containing the soluble solids in solution. In practice, the relative position of the chute 22 is adjusted so that sufficient of the insoluble solids from screen 11 drop directly into the mixer to insure that within the mixer the insoluble solids will be present to the extent of from 45% to 165% by weight of the soluble solids and preferably to the extent of from 75% to 125% by weight of the soluble solids.

This mixture of the liquor containing the soluble solids with the stated amounts of insoluble solids suspended therein passes through the mixer outlet pipe 31, then to the first unit 32 of a series of multiple-effect evaporators. Steam to effect evaporation is introduced into evaporator 32 through pipe 33 while the condensate from this steam passes out of evaporator 32 through pipe 34. Within the evaporator this steam comes into indirect heat exchanging relationship to the mixture introduced, thereby partially evaporating the same. The steam so produced moves out of evaporator 32 through outlet 35 while the now partly concentrated mixture moves out of evaporator 32 through the pipe 36 into the next succeeding evaporator 41. Within evaporator 41 the steam from pipe 35 passes in indirect heat exchanging relationship to the mixture while the condensate from this steam passses out of evaporator 41 through outlet 42. Evaporator 41 is under a lower absolute pressure than evaporator 32 so that the steam from evaporator 32 produces evaporation therein, the steam thereby produced in evaporator 41 passing off through the pipe 43. The now more concentrated mixture passes out of evaporator 41 through pipe 44 by which it is discharged into evaporator 51. Within evaporator 51, the steam from pipe 44 passes in indirect heat exchanging relationship to the mixture, the condensate from this steam passing from the evaporator through outlet 52. The evaporator 51 is maintained under a still lower absolute pressure so that this steam produces evaporation; the vapors thereby produced passing out of evaporator 51 through the pipe 53 connected into barometric condenser 54, by which the desired absolute pressure in evaporator 51 is maintained. The concentrated mixture from the evaporator 51 passes out through outlet 55. At this point the mixture preferably has a water content of not exceeding 80% by weight.

This mixture is discharged into the bite 61 of the drum dryer 62 comprising the drying rolls 63 and 64 mounted respectively on shafts 65 and 66 for rotation in the direction indicated by the arrows respectively thereon. As the rolls revolve, a thin film of the mixture is carried out of the bite of the rolls and is dried progressively as the rolls turn. The dried film is continuously removed by means of one of the doctor blades 67 and 68 and diverted by suitable chutes (not shown) into conveyor 69 by which it is carried to point of storage or shipment. The final product contains not exceeding 15% water and preferably not exceeding 10%.

The product so obtained is a firm relatively stable solid that does not become sticky or tacky and that may be easily and satisfactorily handled as a solid notwithstanding its high percentage of water soluble solids. It is high in proteins, especially water soluble proteins and high in vitamin content and is a valuable feed stock.

The foregoing description is for purpose of illustration and not of limitation and it is, therefore, my intention that the invention be limited only by the following claims or their equivalents, wherein I have endeavored to claim broadly all inherent novelty.

I claim:

1. Process of treating distillery slop from the mashing of cereals and the fermentation and distillation of the mash so obtained which comprises first separating therefrom the relatively larger insoluble solids, thereafter separating from the remainder the liquid portion containing the soluble solids and combining therewith the relatively smaller suspended solids to the extent of from 45% to 165% by weight of the soluble solids, concentrating the same by evaporating water therefrom thereby forming a concentrate and thereafter drying the concentrate so obtained to not exceeding 15% moisture content, thereby forming a feed stock of high soluble protein content that may be easily handled as a solid.

2. Process of treating distillery slop from the mashing of cereals and the fermentation and distillation of the mash so obtained which comprises first separating therefrom the relatively larger insoluble solids, thereafter separating from the remainder the liquid portion containing the soluble solids and combining therewith the relatively smaller suspended solids to the extent of from 45% to 165% by weight of the soluble solids, concentrating the same by evaporating water, thereby forming a concentrate, and drying the concentrate so obtained by the application of the same as a thin film to a heated metal surface thereby reducing the moisture content of the same to not exceeding 15%, thereby forming a feed stock of high soluble protein content that may be easily handled as a solid.

3. Process of treating distillery slop from the mashing of cereals and the fermentation and distillation of the mash so obtained which comprises first separating therefrom the relatively larger insoluble solids, thereafter separating from the remainder the liquid portion containing the soluble solids and combining therewith the relatively smaller suspended solids to the extent of from 45% to 165% by weight of the soluble solids, concentrating the same by evaporating water therefrom to a water content of not exceeding 80% by weight thereby forming a concentrate, and thereafter drying the concentrate so obtained to not exceeding 15% moisture content, thereby forming a feed stock of high soluble protein content that may be easily handled as a solid.

4. Process of treating distillery slop from the mashing of cereals and the fermentation and distillation of the mash so obtained which comprises first separating therefrom the relatively larger insoluble solids, thereafter separating from the remainder the liquid portion containing the soluble solids and combining therewith the relatively smaller suspended solids to the extent of from 45% to 165% by weight of the soluble solids, concentrating the same by evaporating water to a water content of not exceeding 80% thereby forming a concentrate, and thereafter drying the concentrate by the application of the same as a thin film to a heated metal surface, thereby reducing the moisture content of the same to not exceeding 15%, thereby forming a feed stock of high soluble protein content that may be easily handled as a solid.

ELLIS C. PATTEE.